(12) United States Patent  
Walter

(10) Patent No.: US 6,606,980 B1  
(45) Date of Patent: Aug. 19, 2003

(54) FUEL TANK FOR A MOTOR VEHICLE

(75) Inventor: Rüdiger Walter, Bonn (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 0 days.

(21) Appl. No.: 09/919,007

(22) Filed: Jul. 31, 2001

Related U.S. Application Data

(63) Continuation of application No. PCT/DE00/00790, filed on Mar. 14, 2000.

(30) Foreign Application Priority Data

Mar. 20, 1999 (DE) .......................................... 199 12 642

(51) Int. Cl.$^7$ ............................................... F02M 37/04
(52) U.S. Cl. ........................ 123/509; 123/514; 137/576
(58) Field of Search ................................ 123/509, 514, 123/510, 516; 137/572, 574, 576, 571, 573, 565.01, 565.17, 565.34

(56) References Cited

U.S. PATENT DOCUMENTS

| | | | | |
|---|---|---|---|---|
| 5,103,793 A | * | 4/1992 | Riese et al. ................. | 123/516 |
| 5,392,750 A | * | 2/1995 | Laue et al. ................. | 123/509 |
| 5,649,514 A | * | 7/1997 | Okada et al. ............... | 123/514 |
| 5,669,359 A | * | 9/1997 | Kleppner et al. ........... | 123/509 |
| 6,192,869 B1 | * | 2/2001 | Hahner et al. .............. | 123/509 |
| 6,401,751 B2 | * | 6/2002 | Murakoshi et al. ..... | 137/565.34 |

FOREIGN PATENT DOCUMENTS

| | | |
|---|---|---|
| DE | 196 00 872 A1 | 7/1997 |
| DE | 196 05 703 A1 | 8/1997 |
| EP | 0 629 522 A1 | 12/1994 |
| EP | 0 803 394 A1 | 10/1997 |
| EP | 0 901 925 A2 | 3/1999 |
| EP | 0 922 603 A1 | 6/1999 |

* cited by examiner

*Primary Examiner*—Carl S. Miller  
(74) *Attorney, Agent, or Firm*—Akin, Gump, Strauss, Hauer & Feld, L.L.P.

(57) ABSTRACT

A fuel tank for a motor vehicle is provided with a reservoir, which is accessible through a closable opening in the wall of the fuel tank. In order to be able to select the size of the reservoir independently of the size of the opening, the reservoir comprises at least two modules (126, 127) which can be connected to each other and which are assembled within the tank to form the reservoir. At least one module of the reservoir can already be inserted into the tank when producing the tank. Additional modules can be inserted into the finished tank through the opening in the wall of the tank. It is also possible for all modules forming the reservoir to be subsequently inserted into the tank through the opening in the wall of the tank.

24 Claims, 8 Drawing Sheets

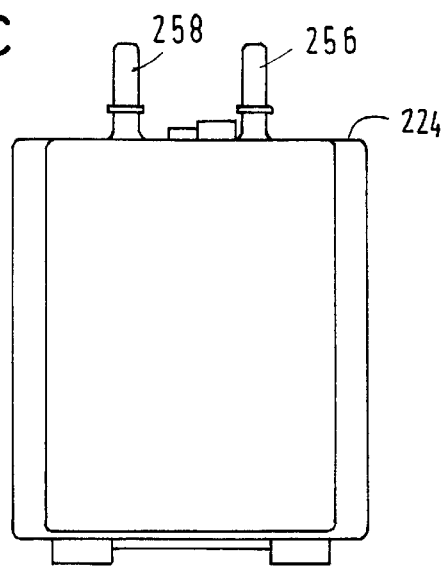
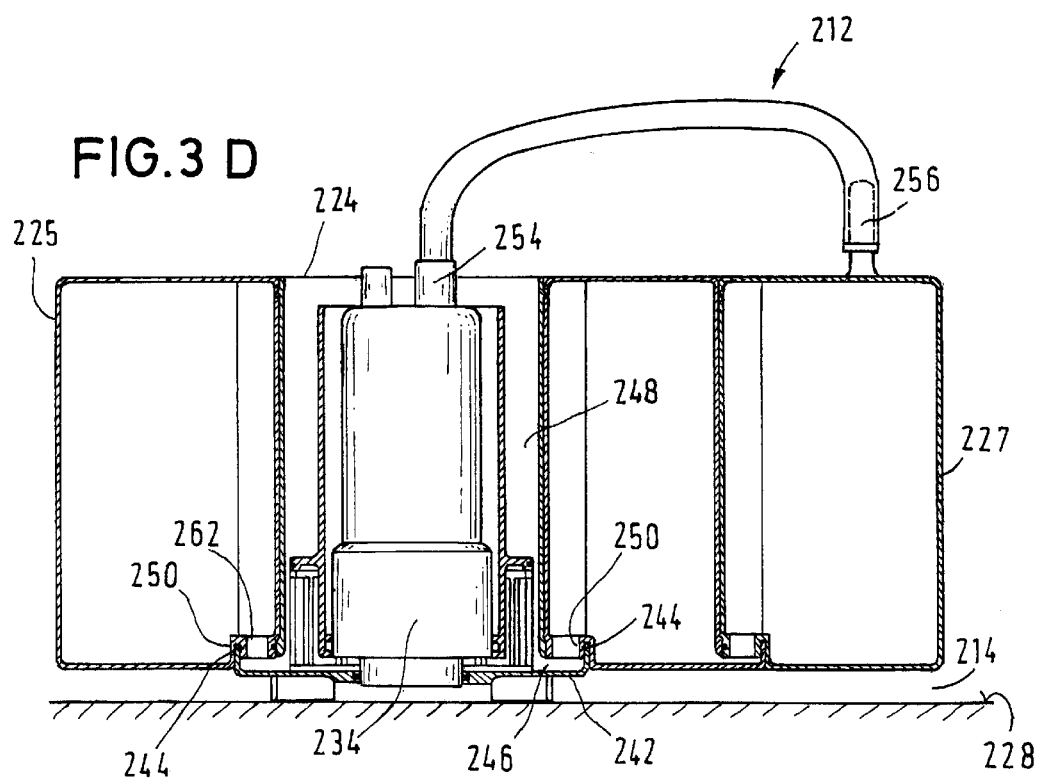

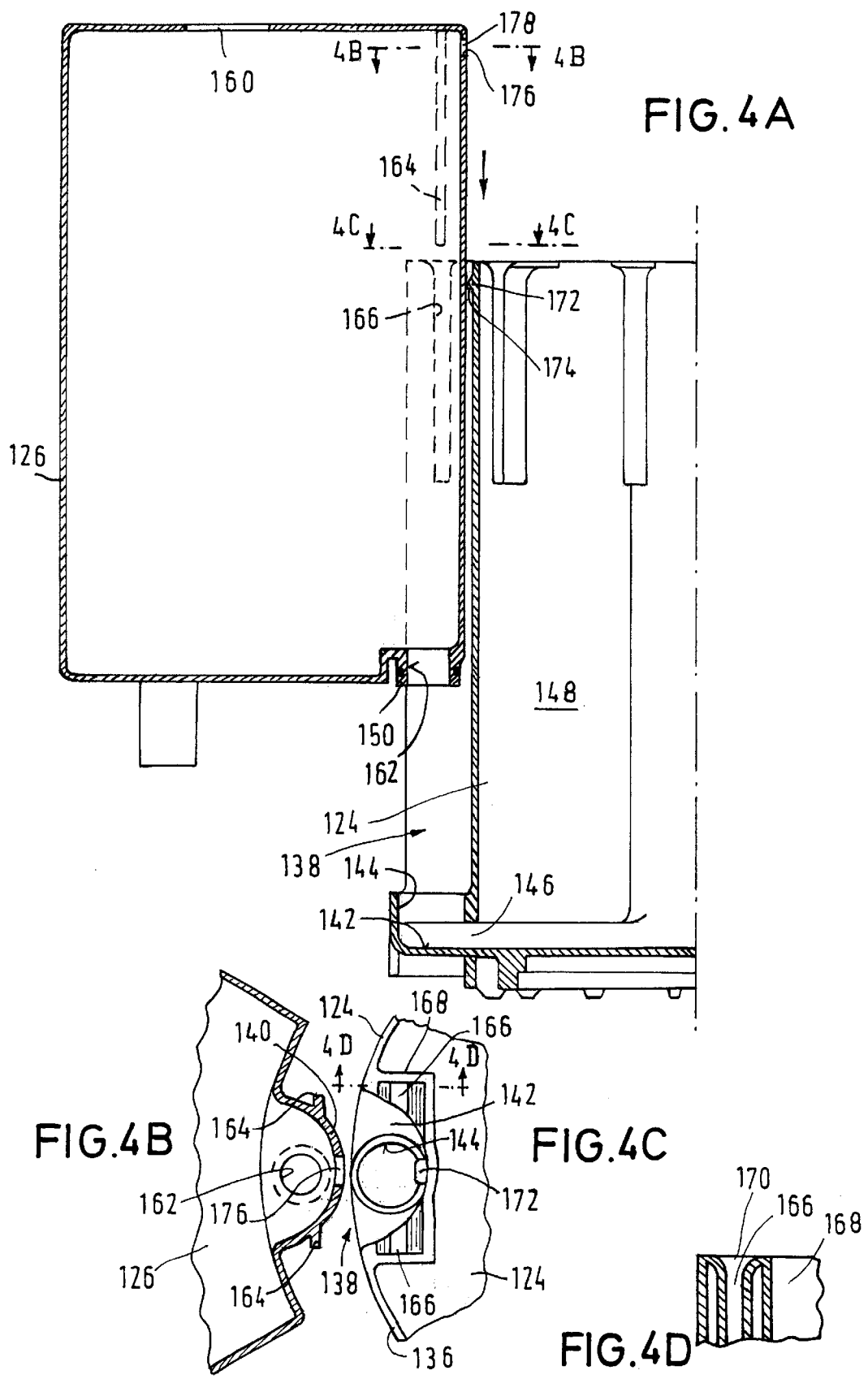

FUEL TANK FOR A MOTOR VEHICLE

CROSS-REFERENCE TO RELATED APPLICATION

This application is a continuation of co-pending International Application No. PCT/DE00/00790, filed Mar. 14, 2000, entitled "Fuel Tank for a Motor Vehicle", the disclosure of which is incorporated herein by reference.

BACKGROUND OF THE INVENTION

The invention relates to a fuel tank for a motor vehicle, having a reservoir arranged therein and being accessible through a closable opening in the wall of the fuel tank.

Particularly in the case of the one-piece fuel tanks of thermoplastic material, which are usual nowadays, the size of the reservoir, which generally also contains the fuel pump for supplying the engine, is subject to certain limitations. This is to be attributed to the fact that the reservoir is either subsequently inserted into the fuel tank through an opening in the wall thereof, or it is already inserted during the production procedure into the preform from which the fuel tank is formed. In the former case the dimensions of the opening in the wall of the tank, which cannot be selected to be just any dimensions, determine the size and thus the capacity of the reservoir. The latter situation involves restrictions in regard to the size of the reservoir, which arise out of reasons relating to production procedures and in particular also out of the cross-sectional dimensions of the preform, which is generally produced by means of extrusion and which is expanded to form the tank by virtue of an internal increased pressure in a blow molding mold.

On the other hand, extreme operating states of the motor vehicle, for example due to an extreme position of inclination or very high levels of centrifugal force when negotiating bends, can have the result that a possibly large amount of fuel is drawn per unit of time exclusively from the reservoir, in which case it is necessary to ensure that, even under those conditions, there is always a sufficient amount of liquid within the reservoir in the proximity of the intake opening of the fuel pump.

In many cases, therefore, it is deemed necessary for the reservoir to involve a filling volume of at least two liters so that, for example in the case of off-road vehicles, a sufficiently large amount of fuel can be held in the intake region of the fuel pump over a prolonged period of time under all operating conditions which come into consideration in a practical context. In that respect, it is to be borne in mind that, under certain operating conditions, for example when the vehicle is in an inclined position, there is a tendency for the fuel to flow into the region of the reservoir which is lowest in the respective inclined position and to collect there so that, even when the tank has a relatively large reservoir, under some circumstances there is no longer any fuel in the intake region of the fuel pump.

BRIEF SUMMARY OF THE INVENTION

Accordingly, an object of the present invention is to design a fuel tank of the type described at the outset of this specification so that, even if the interior of the tank involves only restricted accessibility, it is possible to provide a reservoir which is sufficiently large as to ensure the presence of a sufficiently large amount of fuel in the reservoir in the intake region of the pump under all travel conditions which come under consideration in practical operation.

The way in which this object is attained can be summarized to the effect that the reservoir comprises at least two modules which can be connected together and which are assembled within the tank to form the reservoir, wherein all modules can be inserted into the tank through the opening in the tank wall. However, it is also possible that in production of the tank at least one module is already inserted therein, and additional modules, after production of the tank and possibly also after the provision of a special opening in the tank wall, are inserted into the tank and connected to each other and/or to the module already disposed in the tank.

The resulting reservoir will generally be too large for it to be capable of being introduced into the tank through the opening in the wall of the tank. Therefore, it will generally be dependent on so selecting the size of the individual modules and the shape thereof that, on the one hand, they can be inserted through the opening in the wall of the finished tank into the tank or into the preform from which the tank is produced, and all modules can then be connected in the tank to each other and to the wall of the tank. In this regard, there is no need for the modules to be connected together in the position of the reservoir which corresponds to the operating position of the reservoir.

In addition, in particular, depending on the size of the individual modules, it may be desirable to provide them with internal fitments or baffles in order to ensure that, when negotiating prolonged bends or when the vehicle is in an inclined position, the fuel does not collect in a short time, for example in the lowermost region of the respective module. A labyrinth-like geometry is normally provided in any case in the module which accommodates the fuel pump, by virtue of the pump and the associated components, and that geometry prevents this module from running empty in a very short period of time under the abovementioned operating conditions.

Filling of the modules can be effected by way of a fuel pump, which can be of a two-stage nature, wherein the first stage serves for filling the reservoir and the second stage supplies the engine with fuel from the reservoir. However, it is also possible to provide a single-stage motor-driven pump and at least one suction jet pump, by means of which the reservoir is filled. The latter, that is to say the modules forming it, are advantageously sealed off in such a way that, when the pump or pumps is or are stopped, as far as possible no fuel flows out of the reservoir into the space surrounding it in the tank.

It may also be desirable for at least a part of the modules to be closed on the top side except for a small orifice, in order thereby to prevent fuel from sloshing in relatively large amounts out of the respective module at the top.

It is also possible for different functions to be associated with the modules in such a way that, for example, at least one module is in the form of a fuel filter or is provided with such a filter. There is also the possibility of associating with at least one of the modules a device for measuring the filling level in the tank or possibly also in one of the modules. The nature and the positioning of the communications between the individual modules can be different, so that they are each adapted to the respective functions.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 3C is the associated front view of FIG. 3A;

FIG. 3D is a view in section taken along line 3D—3D in FIG. 3B;

FIG. 4A is a view on a larger scale of two modules, which are to be connected together, of a reservoir in an intermediate state during the connecting procedure;

FIG. 4B is a view in section taken along line 4B—4B in FIG. 4A;

FIG. 4C is a view in section taken along line 4C—4C in FIG. 4A;

FIG. 4D is a view in section taken along line 4D—4D in FIG. 4C;

DETAILED DESCRIPTION OF THE INVENTION

Figure 1:
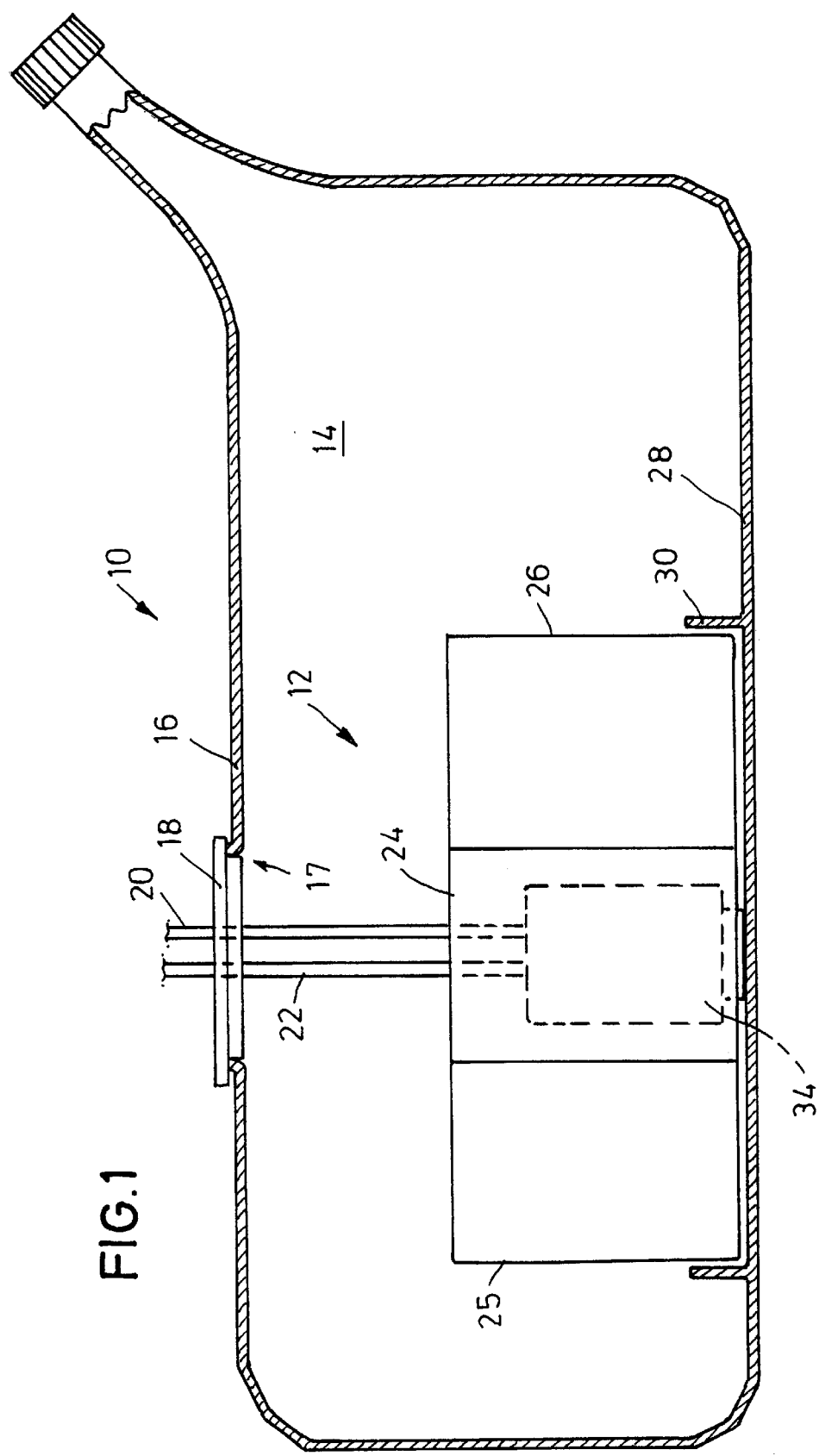
FIG. 1 is a diagrammatic view of a fuel tank according to the invention with a multi-part reservoir disposed therein.
Figure 2A:
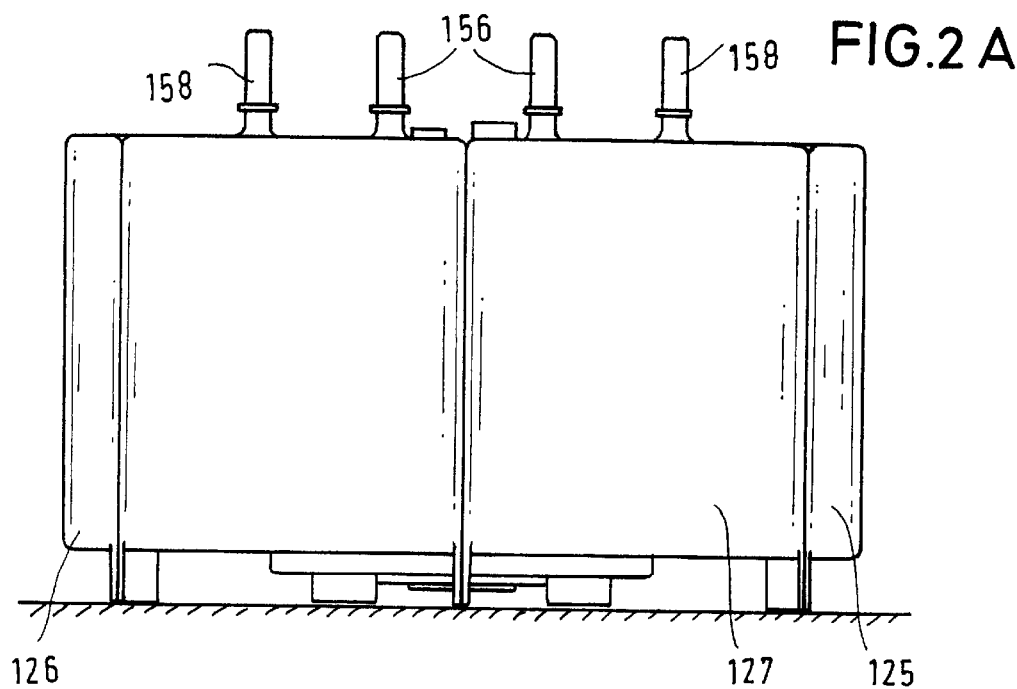
FIG. 2A is a side view of a second embodiment of a reservoir according to the invention.
Figure 2B:
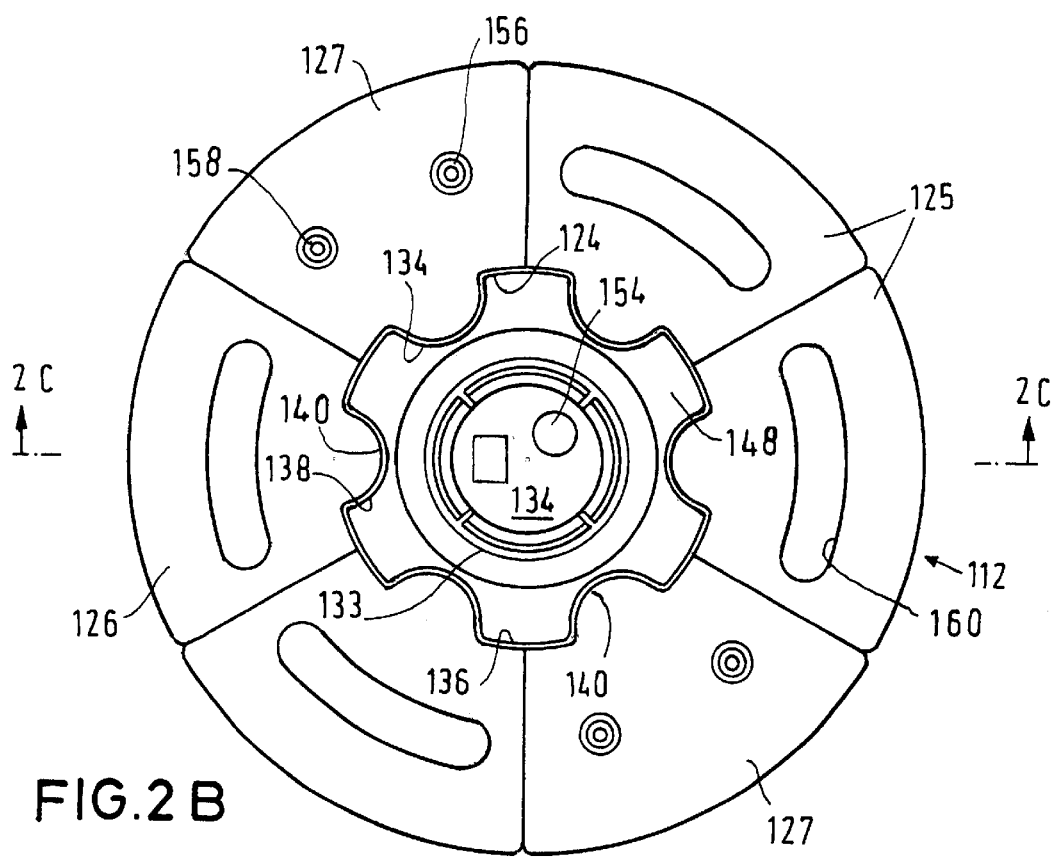
FIG. 2B is the associated plan view of FIG. 2A.
Figure 2C:
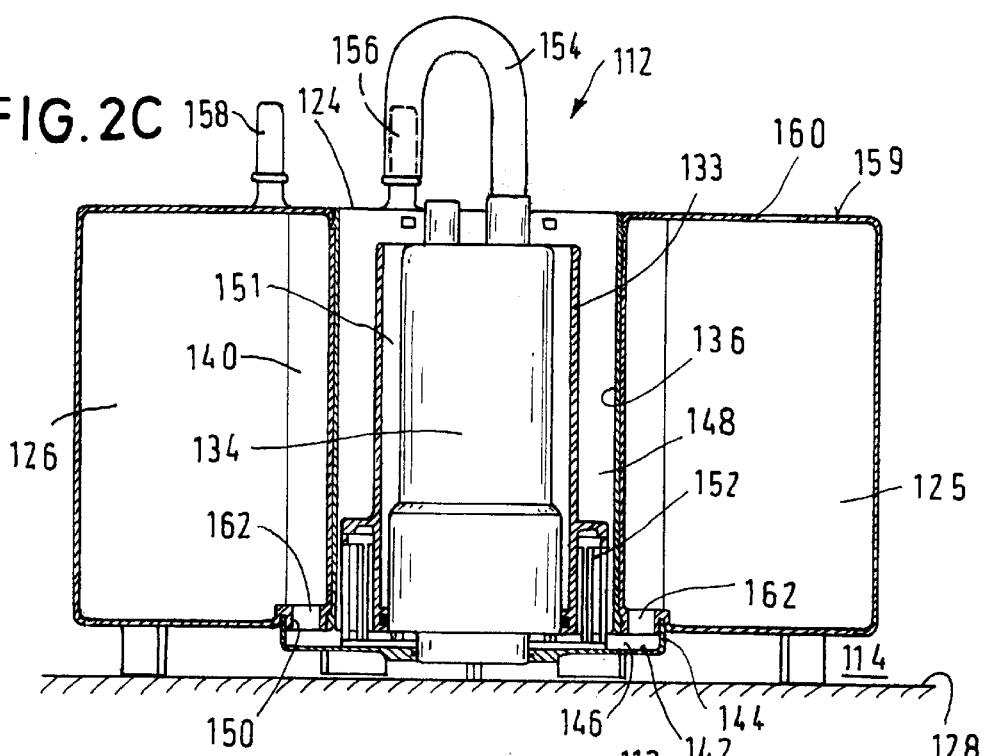
FIG. 2C is a view in section taken along line 2C—2C in FIG. 2B.
Figure 2D:
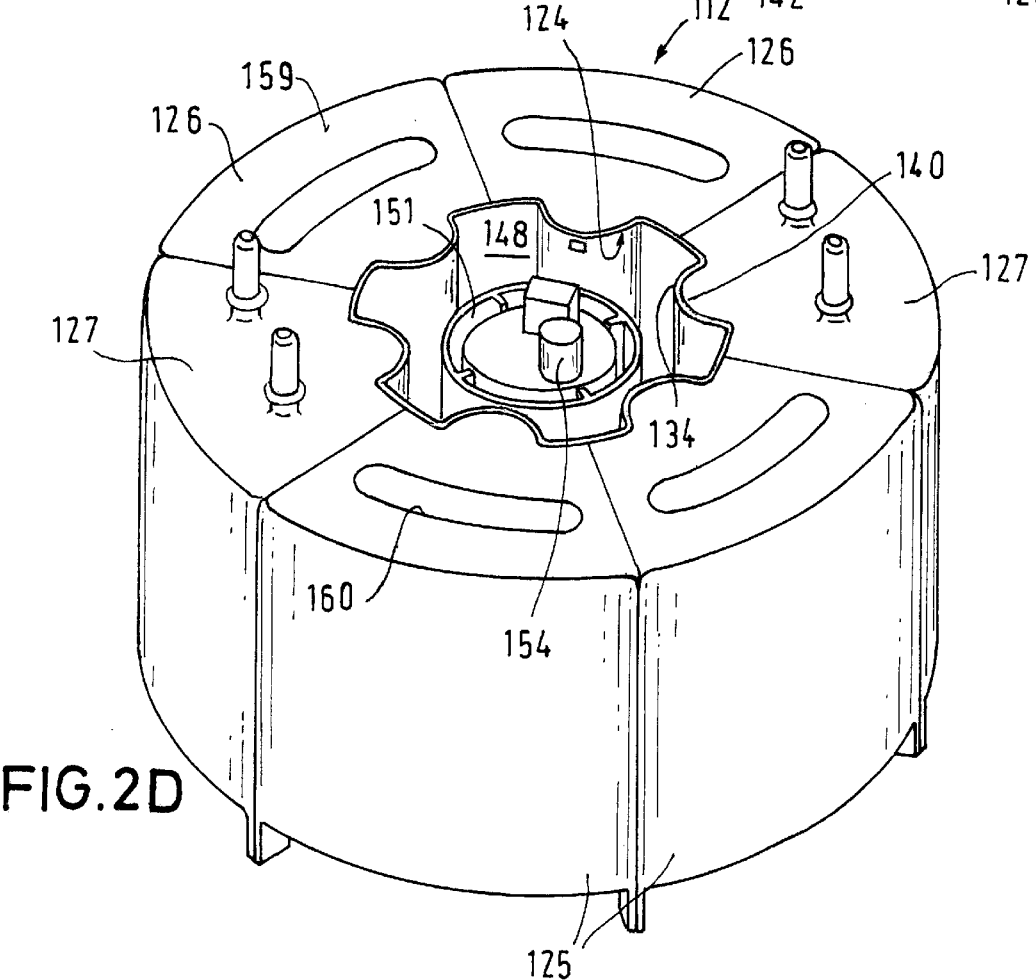
FIG. 2D is a perspective view of the reservoir.
Figure 3A:
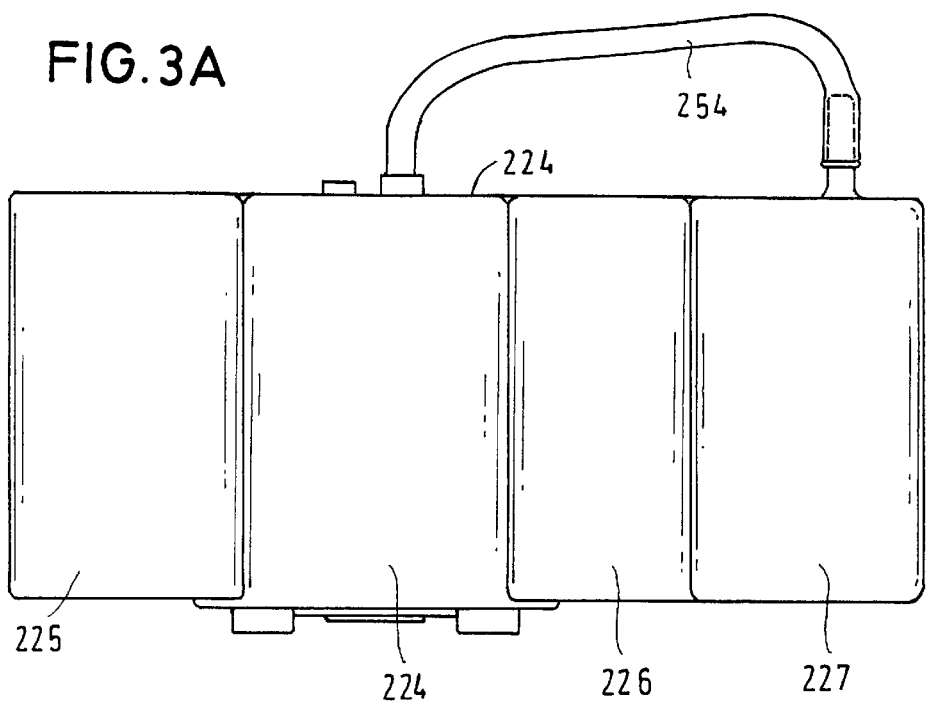
FIG. 3A is a side view of a third embodiment of a reservoir according to the invention.
Figure 3B:
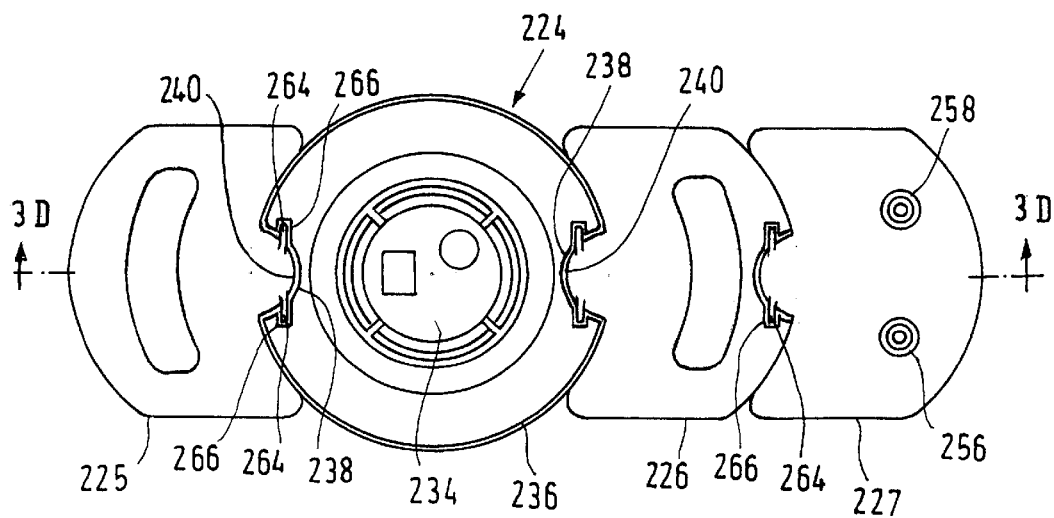
FIG. 3B is the associated plan view of FIG. 3A.

The basic concept of the invention is firstly described with reference to FIG. 1, which is a highly diagrammatic view in longitudinal section of a fuel tank 10 to be installed in a motor vehicle. FIG. 1 shows only the parts which are essential for the invention.

Arranged within the fuel tank 10 is a container system which serves as a reservoir 12 and which receives fuel by means of at least one pump from the space 14 surrounding it within the tank 10 and which, on the other hand, is so sealed off with respect to the space 14 that only very little fuel, if any, can flow per unit of time from the reservoir 12 into the surrounding space 14. The primary function of the reservoir 12, within which is arranged the fuel pump by means of which the engine is also supplied with fuel, is that of maintaining in the region of the suction intake opening of the pump, under all possible operating conditions, an amount of fuel which is sufficient that, even under extreme operating conditions, for example when the vehicle is in extreme positions of inclination, the supply of fuel to the pump and thus the engine is guaranteed.

The wall 16 of the tank 10 is provided with an opening 17, which can be closed by a closure, for example in the form of a cover 18. Extending through the cover 18 is the line 20 through which the engine of the vehicle is supplied by the fuel pump disposed in the reservoir 12. The electrical lines 22 for the motor of the fuel pump are also passed through the cover 18.

FIG. 1 shows that the dimensions of the reservoir 12 in its entirety are larger than those of the opening 17 in the tank wall 16. For that reason, there is the need for the reservoir 12 to be assembled from a plurality of individual portions or modules which are separately inserted through the opening 17 into the tank 10 and connected together within the tank. The embodiment shown in FIG. 1 has three such modules of which the first module 24, which is at the center, contains the fuel pump. The second module 25 and the third module 26 are arranged at respectively opposite sides of the first module 24 and are connected thereto, in such a way that all three modules 24, 25, 26 form the container system 12 which serves as the reservoir and surge or swirl pot.

Each of the modules 24, 25, 26 must be so dimensioned that it can be passed through the opening 17 in the tank wall 16, in which respect, possibly in dependence on the spatial conditions involved, there is the need for all modules to be firstly inserted into the tank 10 before they can then be assembled. It is apparent that it is thereby possible to provide within the tank 10 a reservoir which involves many times the volume of a reservoir, which only comprises one portion, whose volume is determined by the size of the opening 17 in the tank wall.

Possible ways of connecting the individual modules to each other will be described with reference to the embodiments hereinafter, by way of example. FIG. 1 shows that the bottom wall 28 of the tank 10 can be provided with a preferably peripherally extending holder 30 for determining the position of the container system 12, while that holder 30 also contributes to holding the modules in their operative position.

FIGS. 2A through 2D show a reservoir 112 in the form of container system in which a plurality of modules are arranged in a circular configuration around a central module 124. The basic structure is identical to that shown in FIG. 1, so that mutually corresponding parts are also denoted by the same reference numerals, but those used in relation to the embodiment of FIGS. 2A through 2D are higher by 100 than in FIG. 1.

The central module 124, which is provided with the two-stage fuel pump 134 arranged within a tube 133, has a peripherally extending boundary wall 136 provided with inwardly extending recesses 138, which are arranged at regular spacings around the periphery and which extend parallel to the longitudinal axis of the reservoir. Into each of these recesses 138 engages the respective correspondingly shaped projection 140 of one of the six modules 125, 126, 127 surrounding the central module 124, in order thus at any event to afford a positively locking connection, which is operative in the peripheral direction of the container system 112.

Figure 4E:
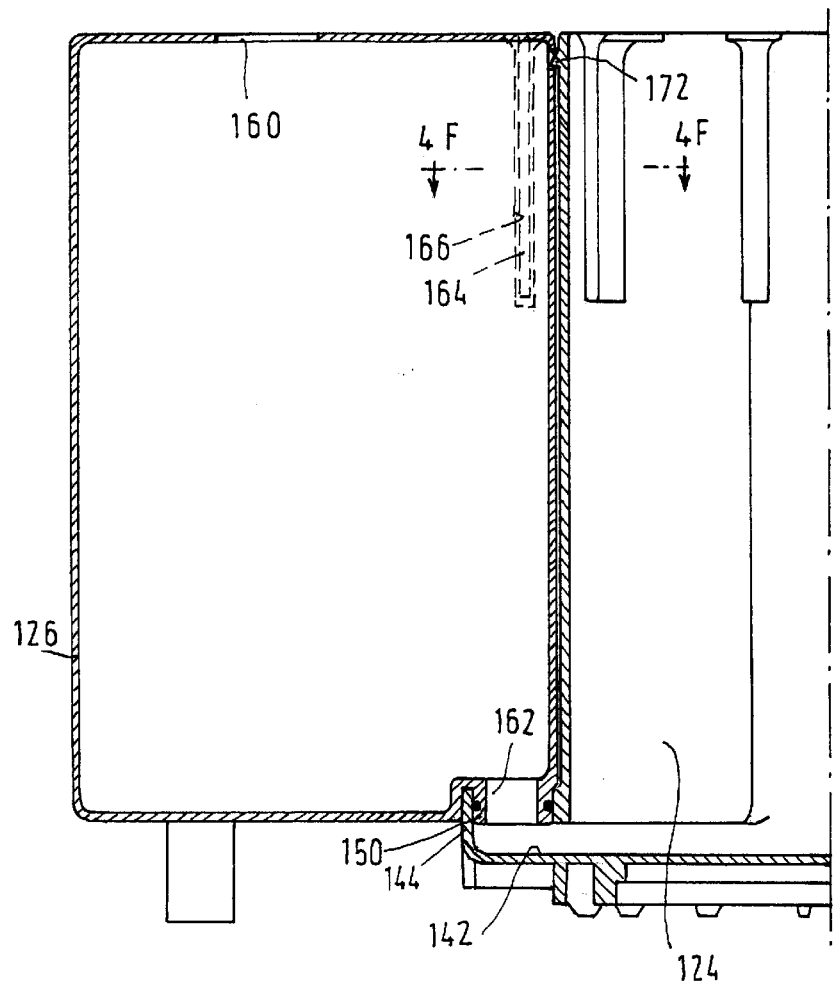
FIG. 4E is a view of the two modules shown in FIG. 4A in the interconnected condition.
Figure 4F:
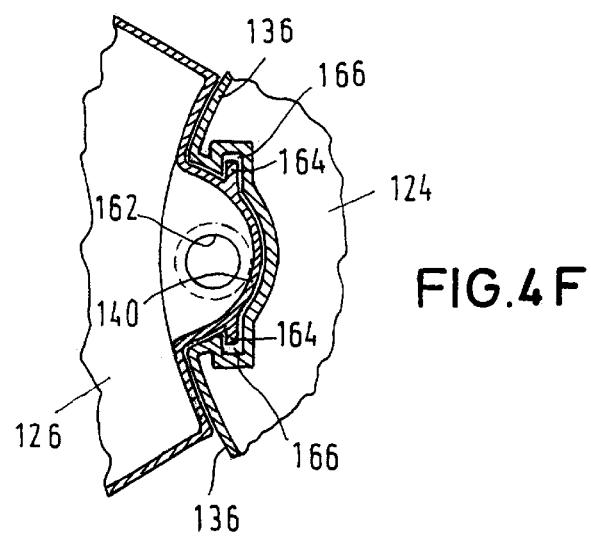
FIG. 4F is a view in section taken along line 4F—4F in FIG. 4E.

Details in regard to the connections between the individual modules are shown in FIGS. 4A through 4F. In order to secure the mounting of the outer modules to the central module 124, each of the outer modules 125, 126, 127 is provided at each lateral boundary wall of the projection 140 with a rib 164 which extends substantially parallel to the longitudinal axis of the central module and which in the assembled condition of the parts engages into a corresponding groove 166 on the central module 124. For that purpose the latter is provided in the upper region of the recess 138 on each of the two sides with a respective protrusion portion 169 (FIG. 4C) within which is arranged the groove 166 which, like also the ribs 164, extends only over a part of the height of the module (FIG. 4A). As the outer module, as shown in FIG. 4A, is inserted from above by relative movement into the central module 124, each groove 166 is provided at the top with an enlargement portion 170 (FIG.

4D) in order to make it easier to introduce the rib 164 of the respective outer module into the groove 166 in the associated recess 138.

Provided at the upper end of each recess 138 on the central module is a chamfered projection 172 which, as normally at least the central module is produced from plastic material, has a certain degree of elastic resilience so that, when the respective outer module is introduced into the associated recess 138 in the central module, that projection 172 and/or the wall carrying it experiences deformation and, after an upper boundary surface and/or edge which co-operates with the projection 172 has passed the abutment surface 174 thereof, springs back into its initial position again and is disposed above the surface or edge of the outer module and thus arrests it in its operative position. To form the boundary edge 176 which engages behind the projection 172, the respective module 125, 126, 127 is provided with an opening 178 through its wall.

The recesses 138 in the central module 124 are each delimited at the lower end by a wall region 142 which is provided on its top side with an annular seat 144 into which a suitably dimensioned stub-shaped extension 150 mounted to the lower region of the respective outer module 125, 126, 127 can be inserted to produce a plug-in connection.

The connection between the internal space 148 of the central module 124 and the passage 162 embraced by the stub-shaped extension 150 and thus the internal space of the respective outer module connected thereto is made by way of a passage 146 at the lower wall region 142.

Insertion of the stub-shaped extension 150 of the respective module is effected simultaneously with insertion of the ribs 164 into the grooves 166 (FIG. 4A) so that in the assembled condition of the parts each of the outer modules is connected at top and bottom to the central module 124 in positively locking relationship therewith. In this case at least one sealing ring, for example an O-ring, can be provided between the seat 144 and the stub-like extension 150, in order to ensure complete sealing integrity although that is not absolutely necessary as the container system is disposed within the fuel tank 10 and minor leakage losses at the connections 144, 150 would not adversely affect satisfactory functioning of the container system.

The two mutually oppositely disposed modules 127 are provided with filter devices, by means of which the fuel flowing through those modules is filtered. In the case of the modules 125, 126 which are respectively arranged in pairs between the two filter modules 127 and which are only attributed with the function of increasing the volume of the reservoir in the case of the embodiment shown in FIGS. 2A through 2D, the passage 146 and the two co-operating parts 144, 150 also provide a communication between the internal space 148 of the central module 124 and the respective module 124, 125. In the case of the two filter modules 127 the passage from the internal space 148 of the central module to the respective filter module 127 is closed for example by a plug disposed in the stub-shaped extension 150.

The first stage of the fuel pump 134 sucks the fuel out of the region of the space 114, which is beneath the container system 112, and conveys that fuel upwardly through the annular space 151 (FIG. 2C) between the housing of the fuel pump 134 and the tube portion 133 so that at the upper end of the tube 133 the fuel passes over into the annular space 148 between the tube 133 and the wall 136 of the central module 124 and can flow from there through the passage 146 and the duct 162 delimited by the stub-shaped extension 150 into the respective module 125 or 126. The second stage of the fuel pump 134 sucks the fuel out of the lower region of the annular space 148 between the tube portion 133 and the wall 136 by way of a first filter device 152 which is also arranged within the annular space 148. The delivery line 154 of the pump 134 is connected to the feed line 156 of at least one of the two filter modules 127. The fuel leaves the filter module, after passing therethrough, through the delivery line 158 which goes to the engine. As there are two filter modules, the fuel coming from the pump 134 can be divided to two filter modules in order to increase the size of the filter area, in which case the fuel flows coming out of the two filter modules 127 are brought together and flow to the engine, as a single resultant flow. However, it is also possible for the two filter modules 127 to be connected in series so that the flow of fuel leaving the fuel pump 134 through the delivery line 154 passes through both modules. For that purpose, the feed and delivery lines 156 and 154 of both modules would have to be suitably connected together.

As the first stage of the pump 134 normally delivers more fuel than is sucked in by the second stage of the pump, a part of the fuel which flows through the internal space 148 flows into the reservoir modules 125, 126 which thus under normal operating conditions are more or less completely filled, with excess fuel passing into the internal space 114 through the overflow openings 160 arranged in the upper cover 159. By virtue of the fact that the duct 162 defined by the stub-shaped extension 150 of the respective reservoir module 125 or 126 is of an only small cross-section, even under extreme operating conditions of the vehicle, for example when it is in an extremely inclined position in which the first stage of the pump possibly no longer draws any fuel out of the space 114, the arrangement guarantees that there is an adequate supply of fuel for the second stage of the pump in the intake region thereof. Subdividing the container system 112 representing the reservoir into a plurality of reservoir modules reduces the risk that, in spite of the large extent of the container system 112, the entire amount of fuel contained therein may collect in a portion of the reservoir which lies outside the suction effect of the second stage of the pump, when the vehicle is in an inclined position or is negotiating an extreme bend. Apart from the overflow opening 160, there are no other openings through which fuel could flow out of the sector-shaped reservoir modules. By virtue of the fact that the modules are very substantially closed at the top end by the covers 159, no fuel can issue at the top end if the modules are not completely filled, even in an extreme position of vehicle inclination, especially as the overflow openings 160 in the covers 159 of the respective modules are arranged in the central region between the two peripheral boundaries of the respective module.

Moreover, it is possible for the individual modules also to be provided with additional internal fitments or baffles, in order to afford a labyrinth geometry within the individual modules, which slows down the movements of the fuel therein and ensures that, in an inclined position, the fuel does not collect in a short time in a relatively small region of the respective module. In the case of the embodiments illustrated in the drawings, the central module is in any case provided with so many internal fitments or baffles that a labyrinth geometry is necessarily involved.

The latter also applies in regard to the embodiment of FIGS. 3A through 3D, which essentially differs from that of FIGS. 2A through 2D in that the individual modules are arranged in series. Parts which are the same as the embodiment shown in FIGS. 2A through 2D are therefore denoted by the same reference numerals but each increased by 100.

The first module 224 which has the fuel pump 234 is provided at its wall, which in other respects is substantially cylindrical, with two recesses 238 which extend vertically and which are arranged in mutually displaced relationship through 180°. Associated with the module containing the pump 234 are two reservoir modules 225 and 226 which are arranged in mutually opposite relationship corresponding to the recesses 238 and which, at their respective side associated with the first module 224, are each provided with a respective projection 240 which, in the assembled condition of the parts, in the manner already described in connection with the embodiment shown in FIGS. 2A through 2D, engages into the respectively associated recess 238 of the first module and thereby forms a positively locking connection.

Figure 5A:
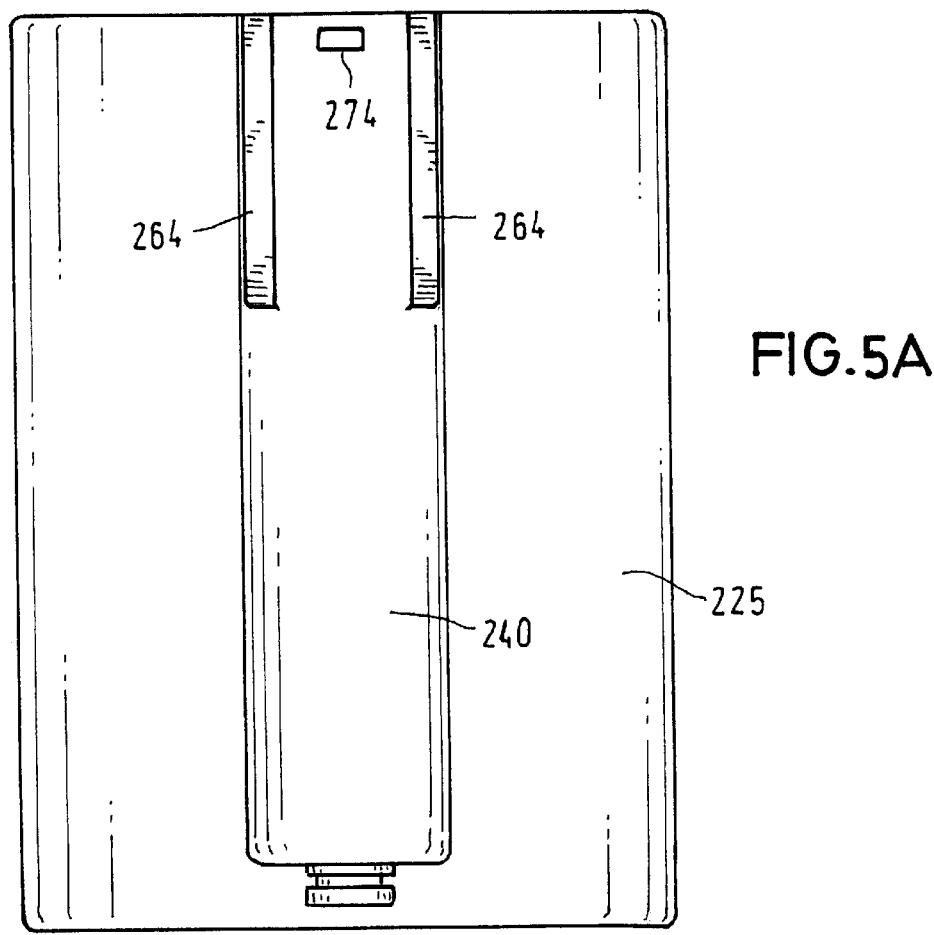
FIG. 5A is an end view of one of the outer modules of the embodiment shown in FIGS. 3A through 3D.
Figure 5B:
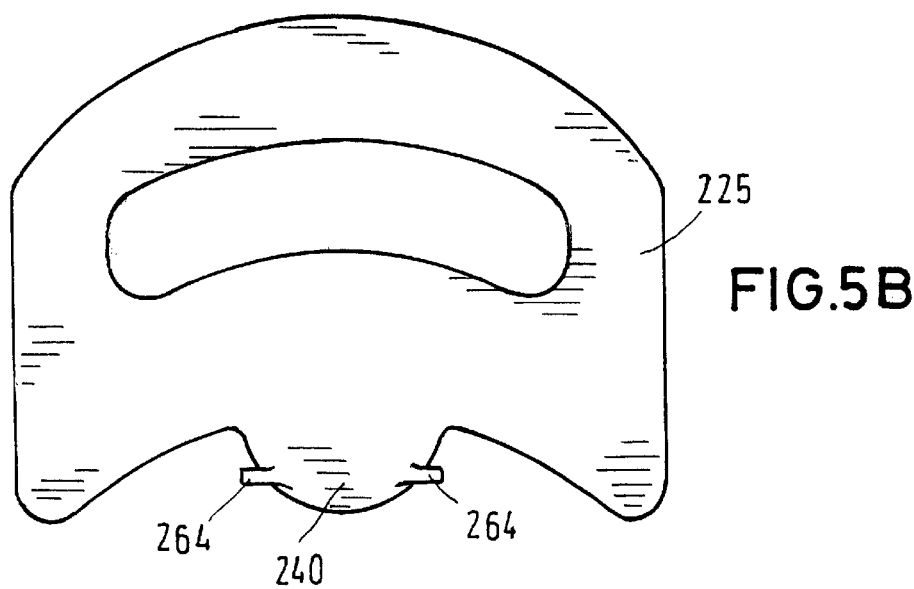
FIG. 5B is the associated plan view of FIG. 5A.

The modules are also connected together in the manner already described in connection with FIGS. 2A through 2D. The additional modules 225, 226, which are directly connected to the first module 234, are provided at their projection 240 at each side with a rib 264 (FIGS. 5A, B) which in the assembled condition of the parts engages in a similar manner into grooves 266 which are provided in the region of the respective recess 238 on the first module 224.

In addition, the first module 224 which has the pump 234 is provided at its lower end in the region of the recesses 238, in the manner also already described in connection with the embodiment of FIGS. 2A through 2D, with a wall region 242 which downwardly delimits the recess 238 and which at the top side has an annular seat 244 into which can be fitted a suitably dimensioned stub-shaped extension 250 disposed at the lower region of the respective reservoir module, for producing a plug-in connection, as can be seen in particular from FIG. 3D of the drawing. In this case also the arrangement has a passage 246 which, jointly with the duct 262 in the stub-shaped extension 250, forms a communication between the internal space of the respective reservoir module 225 and 226 respectively, on the one hand, and the internal space 248 of the first module 224 which in other respects corresponds to the central module 124.

Arranged at the side of the third module 226, which is remote from the first module 224, is a filter module 227, which is also connected to the second reservoir module 226 using ribs 264 and grooves 266 on the projection 240 and the recess 238 respectively and by means of a plug-in connection formed in the above-described manner, although no duct is provided between the two modules 226 and 227.

In this case also the arrangement is such that the delivery line 254 of the second stage of the fuel pump 234 is connected to the feed line 256 of the filter module 227. After flowing through that filter module, the filtered fuel is fed to the engine from the delivery line 258.

In both the above-described embodiments the individual modules are in the form of containers or chambers which are also capable of receiving liquid, irrespective of whether they are assembled with the other modules to form a container system. It will be appreciated that it is also possible for at least a part of the modules to be so designed that they are open at least in the region in which they adjoin an adjacent module, that is to say, they are without a wall, in which case a wall region of the respectively adjoining module closes the open region of the adjacent module in the assembled condition of the parts, and thus two modules have a common wall region. Which of the two constructions is preferred may also depend on the required accuracy of fit of the modules to be connected.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A fuel tank for a motor vehicle, comprising a reservoir (12; 112; 212) arranged in the fuel tank and a closable opening (17) in a wall (16) of the fuel tank through which opening the reservoir is accessible, wherein the reservoir (12; 112; 212) comprises at least two modules (24, 25, 26; 124, 125, 126, 127; 224, 225, 226, 227) which are connectable together and are assemblable within the tank to form the reservoir (12; 112; 212).

2. A fuel tank for a motor vehicle, comprising a reservoir (12; 112; 212) arranged in the fuel tank and a closable opening (17) in a wall (16) of the fuel tank through which opening the reservoir is accessible, wherein the reservoir (12; 112; 212) comprises at least two modules (24, 25, 26; 124, 125, 126, 127; 224, 225, 226, 227) which are connectable together and are assemblable within the tank to form the reservoir (12; 112; 212), wherein the reservoir (112) comprises a central module (124) and a plurality of modules (125, 126, 127) arranged along a periphery of the central module.

3. The fuel tank as set forth in claim 1, wherein a plurality of modules (24, 25, 26; 224, 225, 226, 227) are arranged substantially linearly.

4. The fuel tank as set forth in claim 1, wherein at least a portion of the modules (24, 25, 26; 124, 125, 126, 127; 224, 225, 226, 227) forming the reservoir (12; 112; 212) has a form of a chamber.

5. The fuel tank as set forth in claim 1, wherein, at least two modules of the reservoir are delimited by a common wall region.

6. A fuel tank for a motor vehicle, comprising a reservoir (12; 112; 212) arranged in the fuel tank and a closable opening (17) in a wall (16) of the fuel tank through which opening the reservoir is accessible, wherein the reservoir (12; 112; 212) comprises at least two modules (24, 25, 26; 124, 125, 126, 127; 224, 225, 226, 227) which are connectable together and are assemblable within the tank to form the reservoir (12; 112; 212), wherein at least one module of the reservoir has already been inserted into the fuel tank during production thereof, and at least one other module has been inserted into the fuel tank through the closable opening in the wall of the fuel tank.

7. The fuel tank as set forth in claim 1, wherein at least one (24; 124; 224) of the modules includes a fuel pump (34; 134; 234) by which fuel is fed to an engine of the motor vehicle.

8. The fuel tank as set forth in claim 1, wherein at least one (127; 227) of the modules has a form of a fuel filter or is provided with a fuel filter.

9. The fuel tank as set forth in claim 1, wherein at least a part of the modules are provided at the top side with a cover (159).

10. The fuel tank as set forth in claim 9, wherein the cover is provided with a small orifice (160) for fuel.

11. The fuel tank as set forth in claim 1, wherein at least one of the modules is internally provided with labyrinth-shaped internal fitments which slow down fuel flow.

12. The fuel tank as set forth in claim 1, wherein the reservoir at least predominantly comprises thermoplastic material.

13. The fuel tank as set forth in claim 1, further comprising a seat (30) for the reservoir (12) at a bottom (28) of the fuel tank (16).

14. The fuel tank as set forth in claim 1, further comprising a two-stage fuel pump (134) whose first stage also serves to supply the modules (125, 126) with fuel.

15. A fuel tank for a motor vehicle, comprising a reservoir (12; 112; 212) arranged in the fuel tank and a closable opening (17) in a wall (16) of the fuel tank through which opening the reservoir is accessible, wherein the reservoir (12; 112; 212) comprises at least two modules (24, 25, 26; 124, 125, 126, 127; 224, 225, 226, 227) which are connectable together and are assemblable within the tank to form the reservoir (12; 112; 212), wherein of two modules (124; 224) which are to be connected together one is provided at its peripheral region with a recess (138; 238) and another module (125, 126, 127; 225, 226, 227) is provided with a correspondingly shaped projection (140; 240) which in an assembled condition of the modules engages into the recess.

16. The fuel tank as set forth in claim 15, wherein the one module (124; 224) having a recess (138; 238) is provided with at least one groove (166; 266) in a region of the recess and the projection (140; 240) of the other module (125, 126, 127; 225, 226, 227), which engages into the recess (138; 238), is provided with at least one extension (164; 264) which in the assembled condition of the modules engages into the at least one groove (166; 266).

17. The fuel tank as set forth in claim 16, further comprising two parallel grooves (166; 266) and at least one extension (164; 264) associated with each groove on the other module.

18. The fuel tank as set forth in claim 15, wherein the recess (138; 238) is delimited at a bottom end by a bottom (142; 242) and provided above the recess is a seat (144; 244) into which a coupling portion (150; 250) engages in the assembled condition of the modules, an external cross-section of said coupling portion being adapted to an internal cross-section of the seat.

19. The fuel tank as set forth in claim 18, wherein a space enclosed by the seat (144; 244) is connected by a passage (146; 246) on the bottom (142; 242) to an interior of an associated module (124; 224) and the coupling portion (150; 250) of the other module (125, 126, 127; 225, 226, 227) has a form of a stub connection delimiting a duct (162; 262) which is connected to an interior of the other module.

20. The fuel tank as set forth in claim 15, wherein the modules (124, 125, 126, 127) are held in their operative position in the assembled condition by a snap-action or detent connection (172, 176).

21. The fuel tank as set forth in claim 20, wherein disposed near an end of the recess, which is remote from the seat, on the module (124) is an abutment (172) which in the assembled condition of the modules engages over a region (176) of the other module (125, 126, 127) in order to secure same in its position, wherein the abutment (172) and/or the module (124) carrying it and at least a region of the other module (125, 126, 127) which co-operates with the abutment (172) are of an elastically yielding nature.

22. The fuel tank as set forth in claim 1, wherein a second module of the at least two modules outside the tank is assemblable into side-by side engagement with a first module of the at least two modules already in the tank by a displacement in one direction through the opening into the tank and along a side of the first module.

23. The fuel tank as set forth in claim 22, wherein each module forming the reservoir is sized to be inserted into the tank through the closeable opening.

24. The fuel tank as set forth in claim 1, wherein each of the at least two modules is sized to be inserted into the tank through the closable opening and wherein the reservoir is too large to be removed from the reservoir through the closable opening without disassembly.

\* \* \* \* \*